United States Patent
Fludger et al.

(10) Patent No.: US 9,991,953 B1
(45) Date of Patent: Jun. 5, 2018

(54) TRANSMITTER SELF-CALIBRATION OF TIME DELAY AND FREQUENCY RESPONSE FOR HIGH BAUD-RATE QAM TRANSCEIVERS

(71) Applicant: Cisco Technology, Inc., San Jose, CA (US)

(72) Inventors: Christopher Fludger, Nuremberg (DE); Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/398,897

(22) Filed: Jan. 5, 2017

(51) Int. Cl.
  *H04B 10/073* (2013.01)
  *H04B 10/50* (2013.01)
(52) U.S. Cl.
  CPC ..... *H04B 10/0731* (2013.01); *H04B 10/5057* (2013.01)
(58) Field of Classification Search
  CPC ............................ H04B 10/07–10/0799; H04B 10/505–10/50597; G02F 1/2255
  See application file for complete search history.

(56) References Cited

U.S. PATENT DOCUMENTS

| | | | |
|---|---|---|---|
| 6,392,779 B1 * | 5/2002 | Iannelli | G02F 1/0123 359/237 |
| 7,302,186 B2 | 11/2007 | Light et al. | |
| 7,509,050 B2 | 3/2009 | Ekkizogloy et al. | |
| 7,684,699 B2 | 3/2010 | Schmuck et al. | |
| 8,792,785 B2 | 7/2014 | Jiang et al. | |
| 8,837,934 B2 | 9/2014 | Shih | |
| 8,886,033 B2 | 11/2014 | Azadeh | |
| 9,071,349 B2 | 6/2015 | El-Ahmadi et al. | |
| 9,705,592 B1 * | 7/2017 | Schmogrow | H04B 10/075 |

(Continued)

OTHER PUBLICATIONS

Y. Yue et al., "Detection and alignment of dual-polarization optical quadrature amplitude transmitter IQ and XY skews using reconfigurable interference", #257881, Mar. 21, 2016, vol. 24, No. 6, DOI:10.1364/OE.24.006719, Optics Express 6719, 16 pages.

(Continued)

*Primary Examiner* — David Payne
*Assistant Examiner* — Casey Kretzer
(74) *Attorney, Agent, or Firm* — Edell, Shapiro & Finnan, LLC (57) ABSTRACT

A self-calibration procedure for an optical transmitter is provided. During the self-calibration procedure, a phase bias of an optical modulator of the optical transmitter is set so that an in-phase path and a quadrature path of the optical modulator are in phase. Stimulus signals are supplied to the in-phase and quadrature paths of the optical modulator, over a frequency range. Detection, with a photodetector, is made of an optical output of the optical modulator at a plurality of frequency steps over the frequency range. A photodetector converts an optical output of the optical modulator to an electrical signal. First and second measurement values are generated from the electrical signal output from the photodetector. A frequency spectrum and/or time delay is computed from the first and second measurement values for each frequency step value over the frequency range.

20 Claims, 8 Drawing Sheets

(56) References Cited

U.S. PATENT DOCUMENTS

2008/0247764 A1    10/2008    Lewin et al.

OTHER PUBLICATIONS

D. Rafique et al., "Digital Preemphasis in Optical Communication Systems: On the DAC Requirements for Terabit Transmission Applications", Journal of Lightwave Technology, vol. 32, No. 19, Oct. 2014, 10 pages.

G. Khanna et al., "A Robust Adaptive Pre-Distortion Method for Optical Communication Transmitters", IEEE Photonics Technology Letters, vol. 28, No. 7, Apr. 1, 2016, 4 pages.

Y. Fan et al., "Overall Frequency Response Measurement of DSP-based Optical Transmitter Using Built-in Monitor Photodiode", ECOC 2016, 42nd European Conference and Exhibition on Optical Communications, Sep. 18-22, 2016, Düsseldorf, ISBN 978-3-8007-4274-5, 3 pages.

Trung-Hien Nguyen et al., "Joint Simple Blind IQ Imbalance Compensation and Adaptive Equalization for 16-QAM Optical Communications", 2015 IEEE International Conference on Communications (ICC), Jun. 8-12, 2015, London, ISSN: 1550-3607, DOI: 10.1109/ICC.2015.7249101, pp. 4913-4918, 6 pages.

N. Stojanovic et al., "An Efficient Method for Skew Estimation and Compensation in Coherent Receivers", IEEE Photonics Technology Letters, vol. 28, No. 4, Feb. 15, 2016, pp. 489-492, 4 pages.

G. Khanna "Joint Adaptive Pre-Compensation of Transmitter I/Q Skew and Frequency Response for High Order Modulation Formats and High Baud Rates", Optical Fiber Communication Conference, Mar. 22-26, 2015, Los Angeles, CA, ISBN: 978-1-55752-937-4, 3 pages.

Seb J. Savory, "Digital Coherent Optical Receivers: Algorithms and Subsystems", IEEE Journal of Selected Topics in Quantum Electronics, vol. 16, No. 5, Sep./Oct. 2010, pp. 1164-1179, 16 pages.

C.R.S. Fludger et al., "Transmitter Impairment Mitigation and Monitoring for High Baud-Rate, High Order Modulation Systems", ECOC 2016, 42nd European Conference on Exhibition on Optical Communications, Sep. 18-22, 2016, Düsseldorf, ISBN 978-3-8007-4274-5, 3 pages.

A. Bisplinghoff et al., "Phase Slip Tolerant, Low Power Multi-Level Coding for 64QAM with 12.9 dB NCG", M3A.2.pdf, 2016 Optical Society of America, ISBN 978-1-943580-07-1, 2016 Optical Fiber Communications Conference and Exhibition (OFC), 3 pages.

* cited by examiner

TRANSMITTER SELF-CALIBRATION OF TIME DELAY AND FREQUENCY RESPONSE FOR HIGH BAUD-RATE QAM TRANSCEIVERS

TECHNICAL FIELD

The present disclosure relates to optical transceivers use in an optical communication system.

BACKGROUND

Targeting next generation applications such as 400 Gigabit Ethernet (GE), high-baud rate and higher order modulation schemes, including 44 Gbaud dual polarization (DP)-64 Quadrature Amplitude Modulation (QAM) and 66 Gbaud DP-16QAM, involve precision calibration of optical and electrical components of an optical transceiver. Path timing, particularly between in-phase (I) and quadrature (Q) tributaries, are to be aligned with high accuracy, such as to a difference of 1 picosecond (psec). Frequency response characterization is also used to generate root-raise cosine frequency spectra for close packing of dense wavelength division multiplexed (DWDM) optical channels, and making optimum use of the effective number of bits of a digital-to-analog converter. Thus, proper and highly accurate frequency response characterization leads to correct compensation.

Pluggable optics provide advantages it terms of easy exchange of defective modules, sourcing from multiple vendors, and potentially reduced costs through volume manufacture. However, component tolerances and calibration inaccuracy become enhanced by the separation of optics and the application specific integrated circuit(s) since both linecards and pluggable modulates are to be calibrated separately.

DESCRIPTION OF EXAMPLE EMBODIMENTS

Overview

In accordance with one embodiment, a self-calibration procedure for an optical transmitter is provided. During the self-calibration procedure, a phase bias of an optical modulator of the optical transmitter is set so that an in-phase path and a quadrature path of the optical modulator are, for the purposes of calibration, in phase. A first stimulus signal is supplied at a first frequency to one of the in-phase path or the quadrature path of the optical modulator, and a second stimulus signal is supplied at a second frequency to another of the in-phase path or the quadrature path of the optical modulator. The second frequency is equal to a sum of the first frequency and a relatively small frequency difference. The first frequency is swept over a frequency range at a plurality of frequency steps. Detection, with a photodetector, is made of an optical output of the optical modulator at the plurality of frequency steps over the frequency range. An output of the photodetector is mixed with a first reference signal at a reference frequency that is equal to the relatively small frequency difference, to produce a first mixing output, and is mixed with a second reference signal at the reference frequency, to produce a second mixing output, wherein the first reference signal and the second reference signal are orthogonal in phase to each other. At each frequency step over the frequency range, a first measurement value from the first mixing output and a second measurement value from the second mixing output are derived. At least one of a frequency response and a time delay between the in-phase path and the quadrature path is computed based on the first measurement value and the second measurement value obtained at each frequency step over the frequency range.

Example Embodiments

Coherent optical transmitters involve precise calibration. Timing skew between in-phase (I) and quadrature (Q) tributaries (also referred to as "paths" herein) may need to be maintained in sub-psec levels (1 psec=~0.2 mm). Thus, proper and highly accurate frequency response characterization leads to correct compensation.

The impact of timing skew and frequency response may be even more important in the future as baud rates further increase. Higher baud rates give rise to less tolerance because the symbol period becomes smaller. Higher order modulation formats likewise lead to less tolerance because constellation points become closer together.

Furthermore, calibration is useful for integrated optics and pluggable optics. Pluggable optics may involve a combination of linecard data and optical module data.

Calibration in a factory setting costs time and money. It is common, in existing techniques, to measure frequency spectrum in a factory with high-speed oscilloscopes. Special pluggable modules are used for timing characterization. The timing accuracy of less than 1 psec involves considerable effort. Use of modules and cables for factory calibration adds complexity and makes it more difficult to achieve the sub-1 psec accuracy.

An accurate low-cost technique for in-field measurement of frequency response and I-Q timing skew is highly desirable. Automatic self-calibration is a solution that can provide great benefits, as described below. An automatic self-calibration scheme reduces the factory calibration that is performed on individual pluggable modules.

To this end, automatic in-field "power-on" self-calibration techniques are presented herein. These techniques are applicable to pluggable optical modules and integrated optics, and can use low-cost, low bandwidth components.

Figure 1:
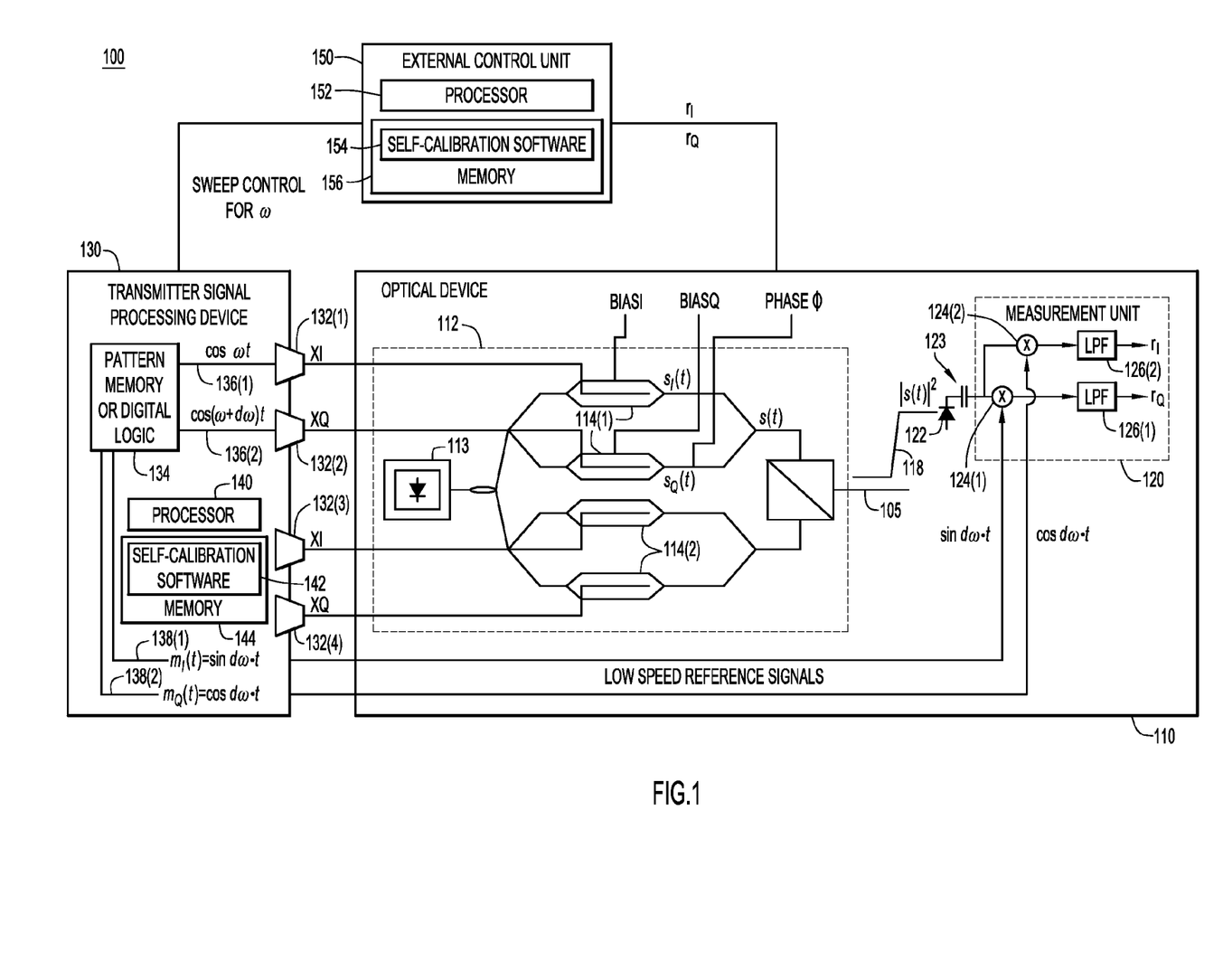
FIG. 1 is a block diagram illustrating an optical transmitter configured to perform a self-calibration procedure, according to an example embodiment.

Reference is now made to FIG. 1. FIG. 1 shows an optical transmitter 100 that may reside in an optical node. The optical node will most likely also include an optical receiver but the optical receiver is not related to the self-calibration techniques presented herein and therefore is not shown in FIG. 1. The optical transmitter 100 is configured to transmit an optical signal on an optical fiber 105.

The optical transmitter 100 includes an optical device/module 110 and a transmitter signal processing device/module 130. Generally, the optical device 110 contains the optical components that are configured to output an output signal to the optical fiber 105 and the transmitter signal processing device 130 is an electrical module that performs signal processing operations in the electrical domain. The transmitter signal processing device 130 may include one or more application specific integrated circuits (ASICs).

The optical device 110 includes an optical modulator 112. The optical modulator 112 may be a single polarization or a dual-polarization optical modulator. FIG. 1 shows an example in which the optical modulator 112 is a dual-polarization Mach-Zehnder optical modulator. The optical modulator 112 includes a laser 113, an X-polarization branch 114(1), and a Y polarization branch 114(2). The optical modulator 112 generates as output modulated optical signals for the X-polarization and Y-polarization that are coupled to the optical fiber 105. A tap coupler 118 is provided to tap the optical output of the optical modulator 112.

The optical device 110 further includes a measurement circuit or unit 120 that is used to perform signal measurement operations as part of the self-calibration procedure described herein. The measurement unit 120 receives an electrical signal derived from the output of the optical modulator 112 by a photodetector 122. A DC blocking capacitor 123 may be coupled to the output of the photodetector 122 prior to supplying the electrical input to the measurement unit 120. The measurement unit 120 operations in the electrical domain and includes a first mixer 124(1), a second mixer 124(2), a first low pass filter (LPF) 126(1) and a second LPF 126(2).

The transmitter signal processing device 130 includes a plurality of digital-to-analog converters (DACs) 132(1)-132(4) for high-speed data signal outputs, each to generate an output that is supplied to a corresponding input of the optical modulator 112. Specifically, the DAC 132(1) outputs an in-phase component for the X-polarization (and is denoted XI), DAC 132(2) outputs a quadrature component for the X-polarization (and is denoted XQ), DAC 132(3) outputs an in-phase component for the Y-polarization (and is denoted YI), and DAC 132(4) outputs a quadrature component for the Y-polarization (and is denoted YQ). The DACs 132(1)-132(4) are used, during normal operation of the transmitter signal processing device 130, to supply electrical I and Q signals (for each of the X-polarization and Y-polarization) to modulate an optical signal for carrying data over the optical signal. As described herein, these same signal paths are used during a self-calibration process when the optical device 100 is turned on or booted up in the field, before beginning normal operation to transmit a modulated optical signal.

The self-calibration procedure involves special signals, not used during normal transmit operation of the optical transmitter 100, to be supplied by the transmitter signal processing device 130 to the optical device 110. To this end, the transmitter signal processing device 130 furthers includes pattern memory or digital logic 134 that is configured to generate a first stimulus signal 136(1) and a second stimulus signal 136(2). The pattern memory or digital logic 134 may be dedicated logic or memory, or already existing logic or memory used for debug and characterization operations. In the example shown in FIG. 1, the self-calibration procedure is being run on the X-polarization branch 114(1), but it should be understood that the procedure would also be performed on the Y-polarization branch 114(2) as well in a similar manner, but for simplicity in the diagram this is not shown.

The first stimulus signal 136(1) is at a first frequency and is supplied to one of an in-phase path or a quadrature path of the optical modulator 112 of the optical device 110, and the second stimulus signal 136(2) is at a second frequency and is supplied to another of the in-phase path or the quadrature path of the optical modulator 112. The second frequency is equal to a sum of the first frequency and a relatively small frequency difference. In the example of FIG. 1, the first stimulus signal 136(1) is supplied to the DAC 132(1) for the I path and the second stimulus signal is supplied to the DAC 132(2) for the Q path. Furthermore, in one example, the stimulus signals are sinusoidal signals. That is, in one embodiment, the first stimulus signal 136(1) is $\cos \omega t$ and the second stimulus signal 136(2) is $\cos(\omega + d\omega)t$, where $d\omega$ is the relatively small frequency difference.

The pattern memory or digital logic 134 also generates low speed reference signals 138(1) and 138(2), denoted $m_I(t)$ and $m_Q(t)$, respectively, that are supplied to the first and second mixers 124(1) and 124(2) of the measurement unit 120 in the optical device 110. As an example, the reference signal $m_I(t)$ is $\sin d\omega \cdot t$ and the reference signal $m_Q(t)$ is $\cos d\omega \cdot t$. Thus, the low speed reference signals 138(1) and 138(2) are both at a frequency that is equal to the relatively small frequency difference $d\omega$, and are orthogonal in phase to each other. The mixers 124(1) and 124(2) shift the electrical signal obtained at the output of the photodetector 122 to baseband.

During the self-calibration procedure, the frequency $\omega$ will be swept over a frequency range at a plurality of frequency steps. For example, the frequency $\omega$ is swept from a few GHz up to a Nyquist frequency of the DACs, while the relatively small frequency difference $d\omega$ is kept fixed at a predetermined amount, such as a 100 kHz. The measurement unit 120 generates a first measurement value $r_I$ and a second measurement value $r_Q$ (taken at the outputs of the LPFs 126(1) and 126(2), at each of the frequency steps of $\omega$. The sweeping of the frequency of the first and second stimulus signals is controlled during the self-calibration procedure. That control may be implemented by a processor 140 that executes self-calibration software 142 stored in memory 144 of the transmitter signal processing device 130. Alternatively, the control may be performed by an external control unit 150 (e.g., microcontroller) that includes a processor 152 that executes self-calibration software 154 stored in memory 156. Furthermore, the self-calibration software performs computation operations on the first measurement value $r_I$ and the second measurement value $r_Q$ to generate a calculation of the frequency response and a time delay estimate (timing skew) between the I and Q paths of the optical modulator 112. Using the frequency response and time delay, the self-calibration software computes one or more parameters for a compensation function based on the frequency response, and a time delay adjustment value based on the time delay.

The processors 140 and 150 may be a microprocessor or a microcontroller. The memories 144 and 156 150 may include read only memory (ROM), random access memory (RAM), magnetic disk storage media devices, optical storage media devices, flash memory devices, electrical, optical, or other physical/tangible non-transitory computer/processor readable media. The processors may execute instructions for the self-calibration software which may be stored in memory, to participate (initiate and control) in the self-calibration procedure described herein.

Bias control of the I and Q paths of the optical modulator 112 is handled in a specific manner during the self-calibration procedure. During normal operation of the optical device, the I and Q paths are biased to be 90 degrees out of phase with each other because that is the purpose of having in-phase and quadrature paths. However, during the self-calibration procedure, as part of an initialization phase, BiasI and BiasQ are set such that the I and Q paths are not 90 degrees out of phase, but instead are in phase. That is, the phase offset of the I and Q paths is set to zero. This is desirable during self-calibration because light on the I path will beat in phase with the light on the Q path. This effectively creates a local oscillator. When the output optical signal of the modulator 112 falls on the "square law" photodetector (low bandwidth photodetector) 122, the output optical signal beats coherently with itself. Consequently, this improves signal-to-noise ratio (SNR) when coupling the stimulus signals cos ωt to one of the I and Q paths and cos(ω+dω)t to the other of the I and Q paths. When the mixers 124(1) and 124(2) mix the output of the photodetector 122 down to baseband, electrical homodyne detection occurs and the mixing term that is desired is obtained, as described further below.

Figure 2:
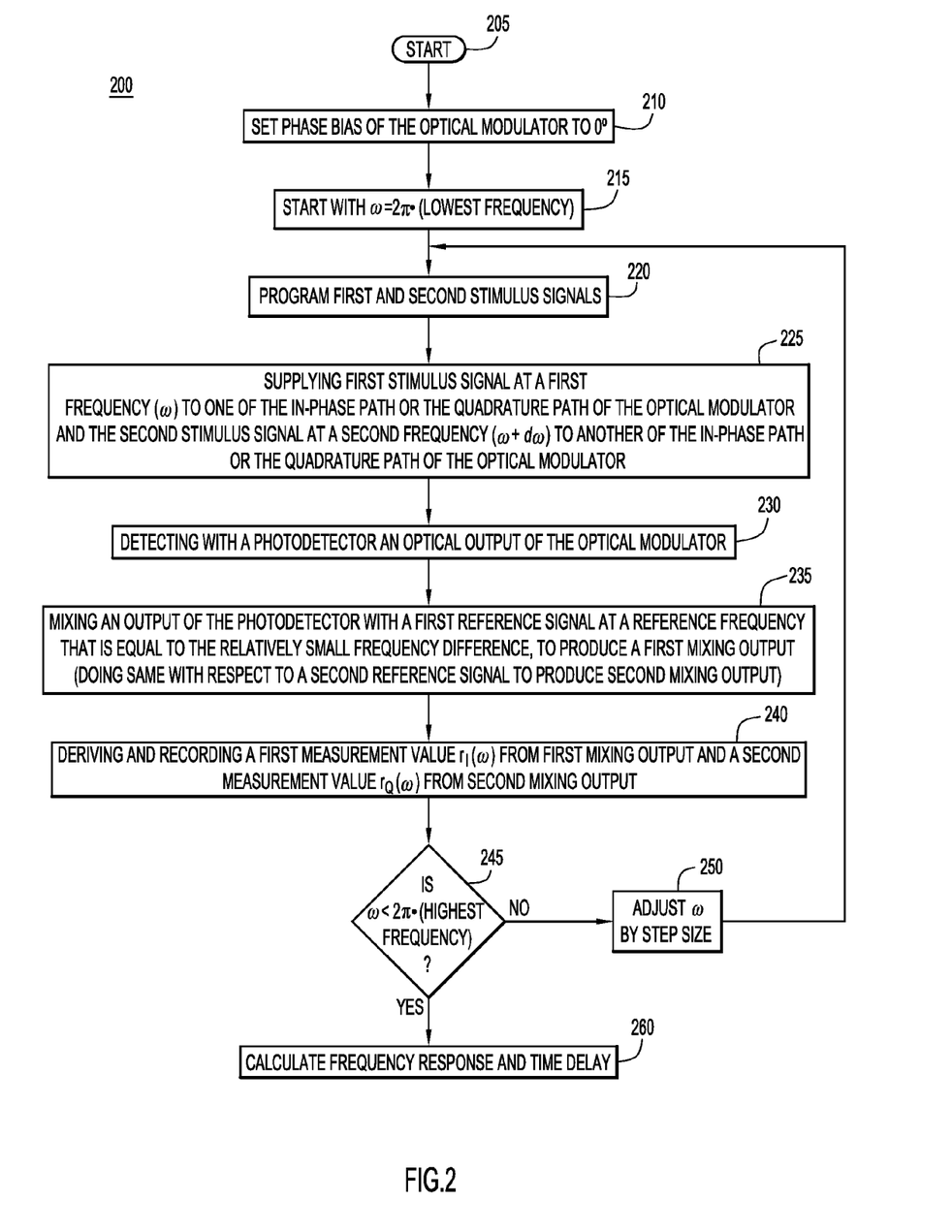
FIG. 2 is a flow chart illustrating operations of an initialization phase and a measurement phase of the self-calibration procedure, according to an example embodiment.

The self-calibration process is done during a bootup or power-up phase of the optical transmitter in the field. Reference is now made to FIG. 2 with continued reference to FIG. 1. FIG. 2 illustrates a flow chart 200 of operations for an initialization phase and a measurement phase of the self-calibration procedure.

The initialization phase starts at 205 and at 210, the phase bias of the optical modulator is set to 0° (zero degrees). That is, while during normal operation the I and Q paths of the optical modulator should be 90 degrees out of phase, during self-calibration, the biases of the I and Q paths are set so that the I and Q paths are in-phase for the reasons described above. Thus, at 210, the phase bias of the optical modulator is set so that an I path and a Q path of the optical modulator are in phase. Either the transmitter signal processor device 130 or the external control unit 150 may send a control signal to the optical device 110 to cause its internal electronics to set BiasI and BiasQ of the optical modulator 112 so that the I path and Q path are in phase. At 215, the initial or starting (lowest) value for the frequency ω is set from which it is incremented at a plurality of frequency steps to span or sweep through a frequency range of interest. In one example, the initial value is 1 GHz and the frequency steps may be 1 GHz.

The measurement phase involves a series of operations that are repeated for each of a plurality of frequency steps of frequency ω. At 220, the first and second stimulus signals (e.g., signals 136(1) and 136(2)) are programmed for generation based on the current value of the frequency ω. At 225, the first and second stimulus signals are supplied to the optical modulator 112. More specifically, the first stimulus signal 136(1) at a first frequency (ω) is supplied to one of the in-phase path 114(1) or the quadrature path 114(2) of the optical modulator 112, and the second stimulus signal 136(2) at a second frequency (ω+dω) is supplied to the other of the in-phase path 114(1) or the quadrature path 114(2) of the optical modulator 112. In the example of FIG. 1, cos ωt is applied to the I path of the X-polarization and cos(ω+dω)t is applied to the Q path of the X-polarization. As described above, the second frequency of the second stimulus signal is equal to a sum of the first frequency and a relatively small frequency difference, i.e., (ω+dω). As explained herein, the frequency ω may be swept from 1 GHz, 2 GHz, 3 GHz, up to the Nyquist frequency, e.g., up to 46 GHz, and dω may be 100 kHz.

With the optical modulator biased to such that the I and Q paths are in-phase, and the first and second stimulus signals supplied to the I and Q paths of the optical modulator, the optical modulator 112 generates an optical output. At 230, the optical output of the optical modulator is detected with the photodetector 122, converting the optical output to an electrical signal, and achieving a square law operation of the optical field in so doing.

The electrical output of the photodetector 122 is supplied to the first and second mixers 124(1) and 124(2), after passing through the DC-blocking capacitor 123. At 235, the output of the photodetector 122 is mixed with a first reference signal at a reference frequency that is equal to the relatively small frequency different (dω) to produce a first mixing output, and is also mixed with a second reference signal at the reference frequency to produce a second mixing output. Again, the first reference signal and the second reference signal are orthogonal in phase to each other, i.e., 90 degrees out of phase. Thus, two mixing operations are performed at 235. A first mixing operation (with a first mixer) to mix an output of the photodetector with the first reference signal at the reference signal to produce a first mixing output, and a second mixing operation (with a second mixer) to mix an output of the photodetector with a second reference signal to produce a second mixing output. It should be understood that the first and second mixing operations are performed in parallel with each other. The lower frequency and (orthogonal in phase) reference signals $m_I(t)$ and $m_Q(t)$ serve as low speed references to the measurement unit 120. By making measurements for $r_I$ and $r_Q$ over the range that ω is swept, it is possible to produce a curve that represents the frequency response (amplitudes at each value of ω) and also obtain a measure of time delay between the I and Q paths.

At 240, a first measurement value, e.g., $r_I(\omega)$, is derived from the first mixing output and a second measurement value, e.g., $r_Q(\omega)$, is derived from the second mixing output. The first measurement value and the second measurement value are stored at 240 for each value of the frequency ω.

At 245, it is determined whether the frequency ω is less than the upper frequency of interest (e.g., the Nyquist frequency of the DACs). If the current value of the frequency ω is less than the upper frequency of interest, then the process continues to step 250. The upper frequency may be, for example, 46 GHz. At 250, the frequency ω is adjusted (increased) by a frequency step amount, such as 1 GHz. Steps 220-245 are repeated for the new value of the frequency ω, ultimately to produce and store the first and second measurement values at the new value of the frequency ω.

In one particular example, the transmitter signal processing device 130 generates a cosine signal on high-speed data output XI at frequency ω, and on data output XQ at frequency ω+dω. The frequency ω is swept from a few GHz up to the Nyquist frequency of the DAC while the frequency difference dω is kept fixed at typically 100 kHz or a small multiple thereof. The child Mach Zehnder modulators of the optical modulator 112 are biased at their null point while the phase φ in the parent modulator is set to 0° to generate constructive interference rather than the typical 90° that is used in operation. The voltage level of the signal waveforms are kept below ±0.5Vπ so that the Mach Zehnder modulators are in the linear regime.

It is assumed that the frequency response on the I path (e.g., XI) and on the Q path (e.g., XQ) is the same since the DACs are well matched in the transmitter signal processing device 130.

When the upper frequency of interest is reached at 245, then at 260, the frequency response between the I and Q paths and the time delay between the I and Q paths is computed from the first and second measurement values computed (and stored) at each of the frequency step over the frequency range that the frequency ω is swept.

The computation of the frequency response and the time delay are now explained. The resulting I- and Q-optical signals generated at the output of the optical modulator during the calibration procedure are given by:

$$s_I(t) = \sin(\bar{a}_I(\omega))\cos\omega(t+dt) \approx \bar{a}_I(\omega)\cos\omega(t+dt) \quad (1)$$

$$s_Q(t) \approx \bar{a}_Q(\omega)\cos(\omega+d\omega)t \quad (2)$$

where $\bar{a}_I$ and $\bar{a}_Q$ are the complex valued frequency responses at frequency ω and dt is the time delay between the I and Q paths.

After square-law detection, the I and Q tributaries beat coherently:

$$|s(t)|^2 = |s_I(t)|^2 + |s_Q(t)|^2 + 2\Re_e\{s_I(t)s_Q^*(t)e^{j\phi}\} \quad (3)$$

$$= |\bar{a}_I|^2\cos^2\omega(t+dt) + |\bar{a}_Q|^2\cos^2(\omega+d\omega)t +$$

$$2\Re_e\{e^{j\phi}\bar{a}_I\cos\omega(t+dt) \cdot \bar{a}_Q^*\cos(\omega+d\omega)t\}$$

The first two terms generate high frequency components near ω and at D.C. These are removed by the D.C. block and the low-bandwidth photo-detector, giving:

$$|s(t)|^2_{dc\_filtered} = \bar{a}_I\bar{a}_Q^*\cos(\omega \cdot dt - d\omega \cdot t)\cos\phi \quad (4)$$

The signal is then mixed with the low frequency cosine and sine reference signals at dω, and low-pass filtered. The reference sinusoid has a fixed phase relationship with the sinusoid dω that is used in the high-speed path, while ω is swept. We assume that the frequency response of I and Q are the same ($\bar{a} = \bar{a}_I = \bar{a}_Q$). This is generally a good assumption since the DACs, drivers and electrical paths are usually very well matched. This yields:

$$r_I = E[|s(t)|^2 \cos d\omega \cdot t] = E[|\bar{a}|^2 \cos(\omega \cdot dt - d\omega \cdot t)\cos(d\omega \cdot t) \cos\phi] \quad (5)$$

$$r_Q = E[|s(t)|^2 \sin d\omega \cdot t] = E[|\bar{a}|^2 \cos(\omega \cdot dt - d\omega \cdot t)\sin(d\omega \cdot t) \cos\phi] \quad (6)$$

where E[ . . . ] is the expectation operator giving the mean average value. The frequency response is given by the power of the two measurements $r_I$ and $r_Q$, and may be normalized at low frequencies. The corresponding phase response can be derived from the Kramers-Kronig transform. The phase angle of $r_I$ and $r_Q$ can be calculated:

$$A_{dB}(\omega) = 5 \log_{10}(|r_I|^2 + |r_Q|^2) \quad (7)$$

$$\theta(\omega) = \arg(r_I + jr_Q) \quad (8)$$

The time delay between I and Q tributaries is calculated from the slope of the θ(ω) against ω:

$$dt = \frac{d\theta(\omega)}{d\omega} \quad (9)$$

The frequency response $A_{dB}(\omega)$ is derived from $r_I$ and $r_Q$ as indicated in the equations above. The phase (angle) θ(ω) is also derived from $r_I$ and $r_Q$, and the time delay or skew between the I and Q channels is represented by how the phase θ(ω) changes over time.

The process depicted in FIG. 2 is performed for each of the X-polarization path and the Y-polarization path.

Figure 3:
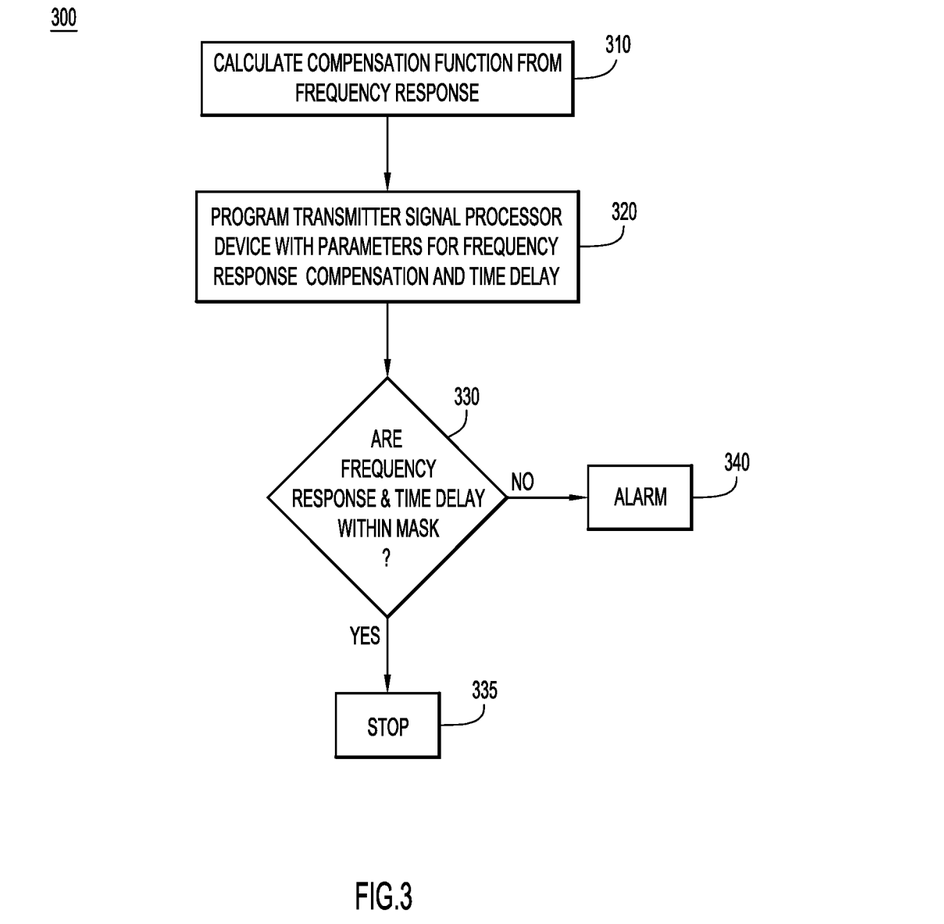
FIG. 3 is a flow chart illustrating operations of a compensation phase and an alarm phases of the self-calibration procedure, according to an example embodiment.

Reference is now made to the flowchart 300 shown in FIG. 3, with continued reference to FIG. 1. FIG. 3 shows how the frequency response and time delay may be used. At 310, a pre-emphasis/compensation function is computed from the frequency response that was computed at 260. The operation 310 may be performed by the transmitter signal processing device 130 or by the external control unit 150, as described above. Thus, the $r_I$ and $r_Q$ values produced by the measurement unit 120 of the optical device 110 are supplied over suitable signal paths to either the transmitter signal processing device 130 or to the external control unit 150. FIG. 1 shows the $r_I$ and $r_Q$ values being supplied to the external control unit but in the embodiment where there is not external control unit or the external control unit does not participate in the self-calibration procedure, the $r_I$ and $r_Q$ are supplied instead to the transmitter signal processing device 130.

At 320, the transmitter signal processor device 130 is programmed with the one or more parameters for the compensation function and a time delay adjustment value. In addition, FIG. 3 shows that a determination may be made at 330 as to whether the frequency response and time delay are within an acceptable mask. If within an acceptable mask, then processing stops as shown at 335. If not, then an alarm condition may be generated as shown at 340. In either case, the self-calibration procedure is complete at this point.

Reference is now made to FIGS. 4-7 for further descriptions of the computations performed at 310 in FIG. 3.

Figure 4:
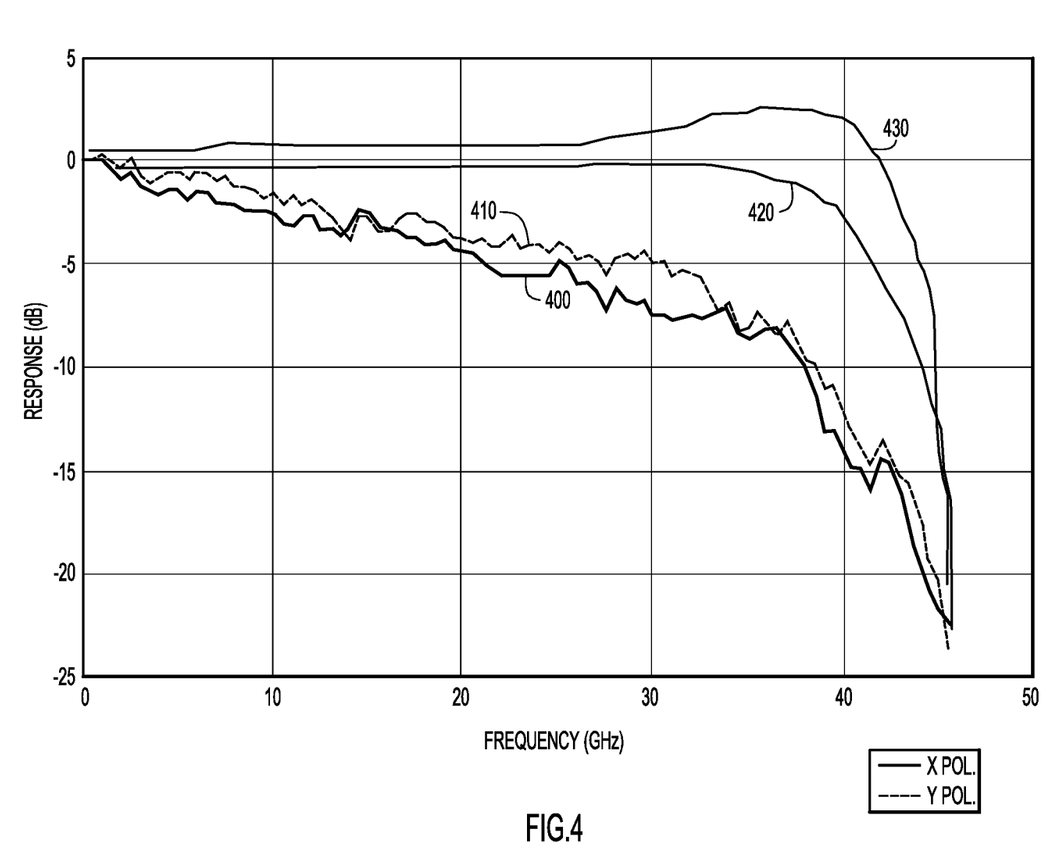
FIG. 4 is a diagram illustrating plots of uncompensated frequency spectra of the optical transmitter and how a compensation function can be generated to compensate the frequency response, according to an example embodiment.

FIG. 4 shows curves for the frequency response for X-polarization and the Y-polarization at 400 and 410 generated according to the computations described above. Reference numeral 420 shows a desired curve for a root-raised cosine for the frequency response. Thus, using any of a variety of computational techniques now known or hereinafter developed, a compensation function having a shape as shown at reference numeral 430 may be computed to achieve the shape of curve 420 when applied to the data for the curves 400 and 410. For example, In general the pre-compensation function C(f)=A_desired(f)/A_real(f). There are other more complex techniques that are known in the art that could be employed, such as those that take into account noise from the DAC (e.g., DACs 132(1)-132(4)). See, for example, "Digital Preemphasis in Optical Communication Systems: On the DAC Requirements for Terabit Transmission Applications", Danish Rafique, Antonio Napoli, Stefano Calabro, and Bernhard Spinnler, JOURNAL OF LIGHTWAVE TECHNOLOGY, VOL. 32, NO. 19, Oct. 1, 2014.

Figure 5:
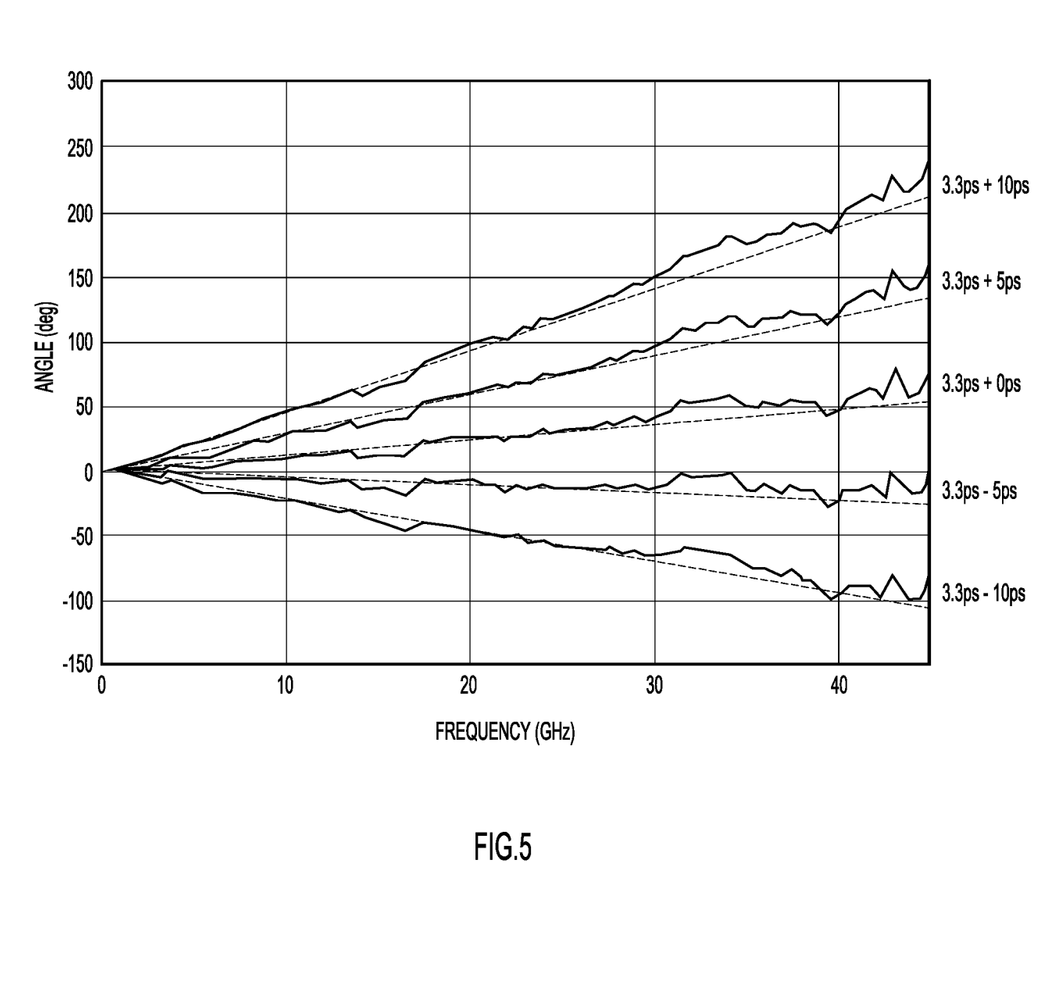
FIG. 5 is a diagram of curves that illustrate measured time delay between in-phase and quadrature paths of the optical transmitter, according to an example embodiment.
Figure 6:
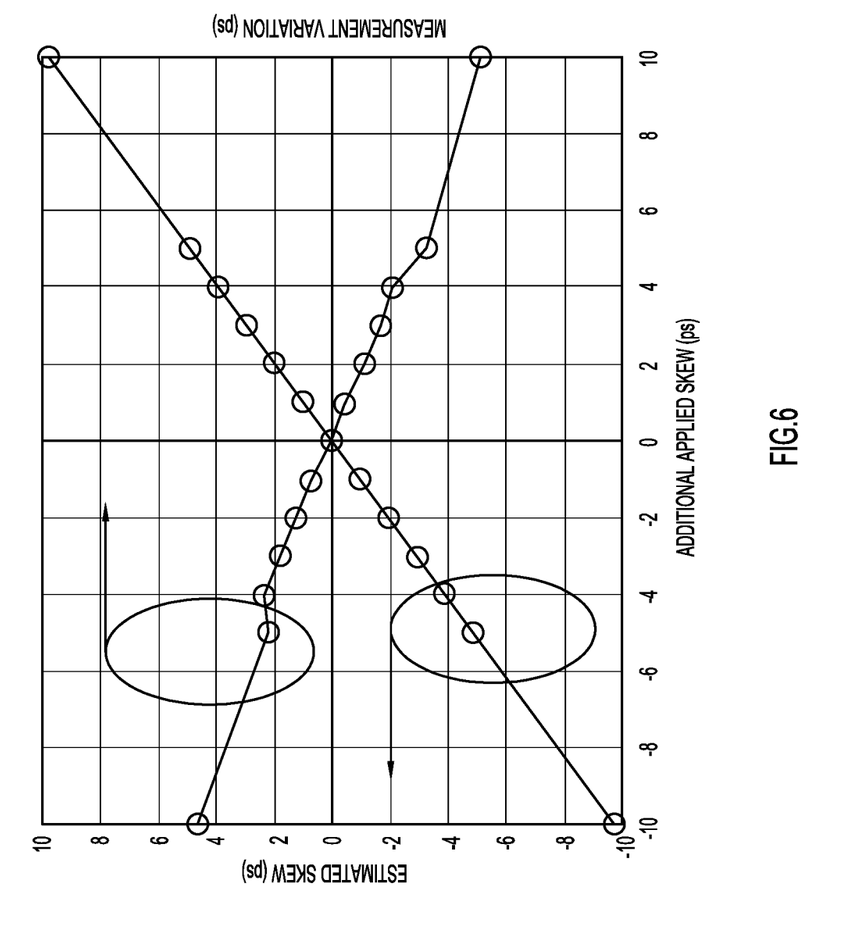
FIG. 6 is a diagram of curves that illustrate how a time delay adjustment value can be generated for the optical transmitter, according to an example embodiment.

Reference is now made to FIG. 5. FIG. 5 shows plots of phase θ as a function of frequency and time delay. The plots shown in this figure indicate that the time delay (averaged between 0 and 30 GHz) is 3.3 psec on the Y-polarization. To verify the time delay characterization, an additional I/Q skew was added to the sinusoid signals in the high-speed data outputs. FIG. 5 shows how the phase angle θ varies with added skew. The additional skew increased the slope of the line as shown. A fit of the slope θ(ω)/ω (shown in dotted line) between 0 and 30 GHz gives the estimated time delay which is plotted in FIG. 6. Thus, FIG. 5 reveals that in a particular example, the time delay between the I and Q signal paths of the optical modulator is 3.3 psec.

Figure 7:
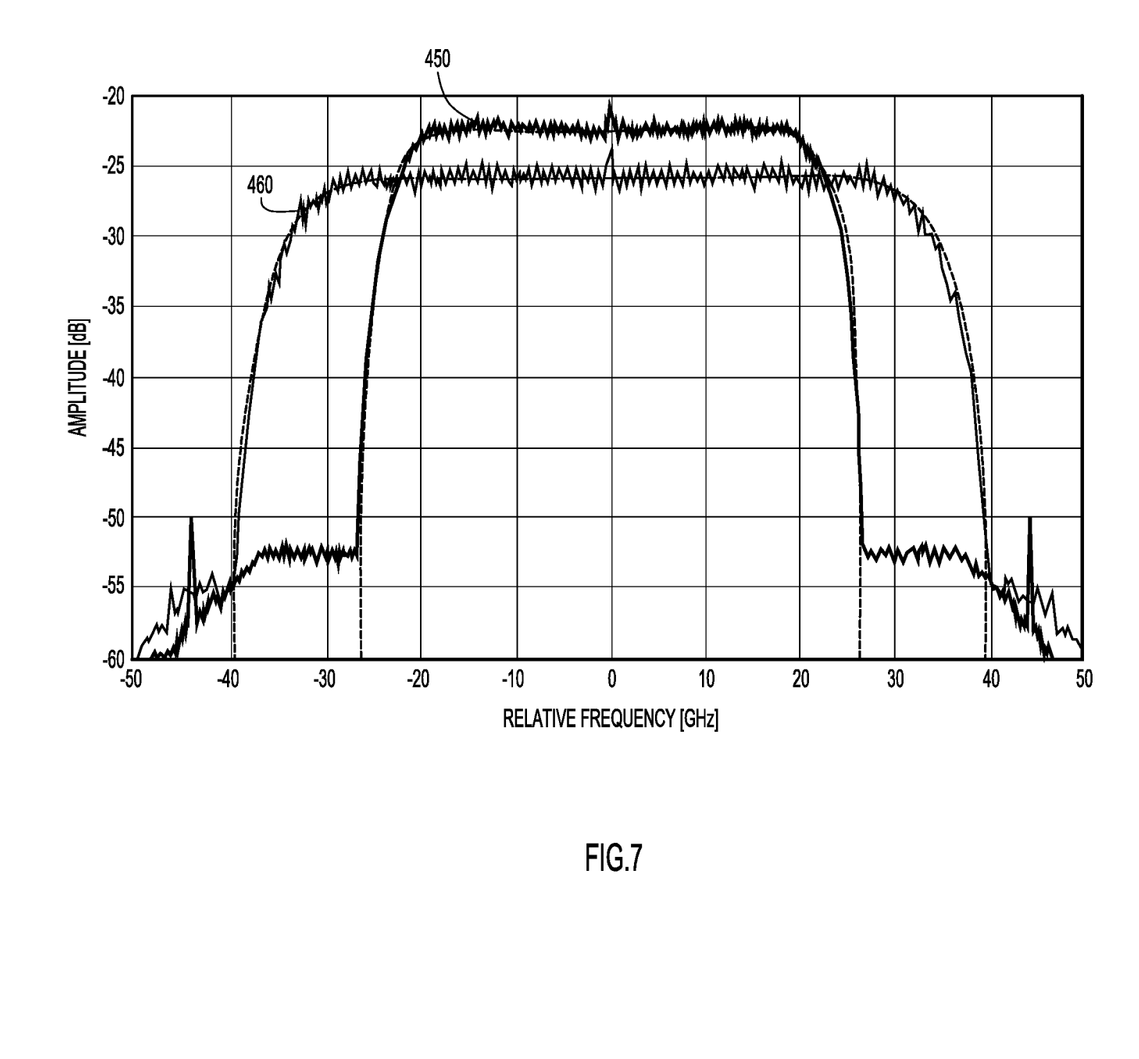
FIG. 7 is a diagram of plots of frequency spectrum for two waveforms and illustrating the performance benefits of the self-calibration techniques, according to an example embodiment.

Reference is now made to FIG. 7. The measured frequency responses and time delay values depicted in FIGS. 5 and 6 were used to generate a compensated transmitter waveform for 44 Gbaud DP-64QAM shown at 450 and 66 Gbaud DP-16QAM shown at 460 (both for 400 GE) with root-raised cosine 0.2. The transmission data, which incorporates payload, forward error correction (FEC) and pilot symbols, were fed to the DACs and the optical spectrum was measured. The dotted lines are reference spectrum for each of the two waveforms and the measured spectrum is shown with respect to the reference spectrum. Comparing with the reference spectrum, an error of less than +/−1 dB was measured to up to the −3 dB roll-off point.

Figure 8:
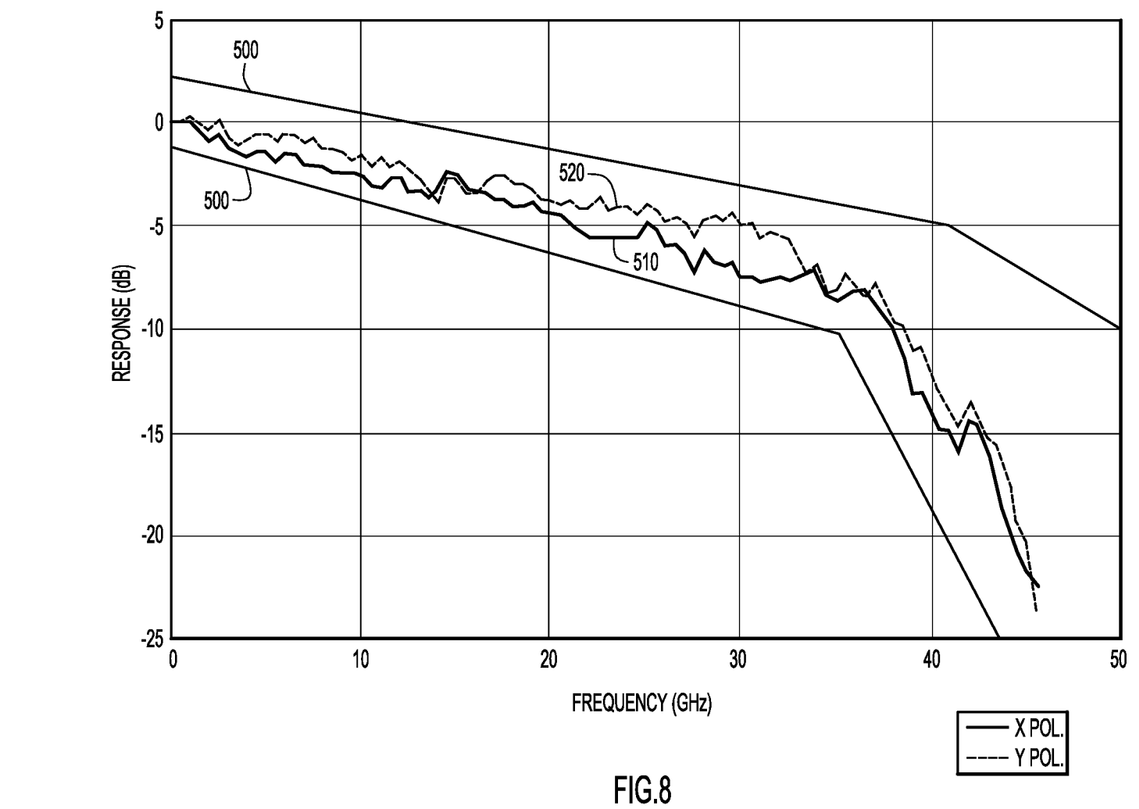
FIG. 8 is a diagram illustrating a mask useful to determine when a frequency response for the optical transmitter is outside of an acceptable range, according to an example embodiment.

FIG. 8 illustrates plots for the measured frequency response to illustrate how an alarm may be generated if the frequency response falls outside of a mask. The mask is shown at reference numeral 500 and the frequency response for the X-polarization and Y-polarization are shown at reference numerals 510 and 520, respectively. An alarm may be generated if the measured frequency response of either the X-polarization or Y-polarization, falls outside the mask 500.

To summarize, self-calibration procedure of an optical transmitter (e.g., device 100 shown in FIG. 2) may involve the following steps: setting phase bias of an optical modulator of the optical transmitter so that an in-phase path and a quadrature path of the optical modulator are in phase; supplying a first stimulus signal at a first frequency to one of the in-phase path or the quadrature path of the optical modulator, and a second stimulus signal at a second frequency to another of the in-phase path or the quadrature path of the optical modulator, the second frequency being equal to a sum of the first frequency and a relatively small frequency difference; sweeping the first frequency over a frequency range at a plurality of frequency steps; detecting, with a photodetector, an optical output of the optical modulator at the plurality of frequency steps over the frequency range; first mixing an output of the photodetector with a first reference signal at a reference frequency that is equal to the relatively small frequency difference, to produce a first mixing output; second mixing the output of the photodetector with a second reference signal at the reference frequency, to produce a second mixing output; at each frequency step over the frequency range, deriving a first measurement value from the first mixing output and a second measurement value from the second mixing output; and computing at least one of a frequency response and a time delay between the in-phase path and the quadrature path, based on the first measurement value and the second measurement value obtained at each frequency step over the frequency range.

One or more parameters for a compensation function are computed based on the frequency response. Likewise, a time delay adjustment value is computed based on the time delay. A transmitter signal processing device is configured with the one or more parameters for the compensation function and with the time delay adjustment value. In some embodiments, only one of the frequency response compensation function and the time delay is computed, and the transmitter signal processing device is configured/programmed with at least one of: the one or more parameters for the compensation function or with the time delay adjustment value.

The first frequency is w and the second frequency is ω+dω, where dω is the relatively small frequency difference. Moreover, the first reference signal and the second reference signal is sin dω·t and another of the first reference waveform and the second reference waveform is cos dω·t.

The detecting, first mixing, second mixing and deriving may be performed at an optical device in which the optical modulator is included.

As described above, the device that controls the self-calibration procedure may be a processor on the ASIC(s) or an external control unit. Similarly, the device that generates the compensation/pre-emphasis function and the time delay offsets may be the processor on transmitter signal processing device, or some an external/separate control unit. The first stimulus signal and the second stimulus signal may be generated at the transmit signal processing device. Control of the sweeping may be performed by the transmit signal processing device. Alternatively, controlling the generating of the first stimulus signal and of the second stimulus signal may be at a control device that is separate from the optical device and the transmitter signal processing device. Likewise, controlling the sweeping may be performed by the control device. The use of the compensation/pre-emphasis function and time delay adjustment value is on the transmitter signal processing device. This compensation may combine calibration data for the linecard.

In conclusion, transmitter time delay offset (skew) between I and Q tributaries can be a significant impairment to high-baud rate, higher-order modulation systems and is to be maintained at sub-psec levels. Presented herein is an accurate self-calibration method for both frequency response and timing skew that uses low-bandwidth components, and may be readily implemented with both pluggable and integrated optics. This lowers manufacturing costs, and reduces inaccuracies in combining calibration data from line card and pluggable optical modules. Measurements have demonstrated its applicability to 400 GE transmission using 44 Gbaud DP-64QAM and 66 Gbaud DP-16QAM.

Thus, in one form, a method is provided comprising: performing a calibration procedure of an optical transmitter, including: setting phase bias of an optical modulator of the optical transmitter so that an in-phase path and a quadrature path of the optical modulator are in phase; supplying a first stimulus signal at a first frequency to one of the in-phase path or the quadrature path of the optical modulator, and a second stimulus signal at a second frequency to another of the in-phase path or the quadrature path of the optical modulator, the second frequency being equal to a sum of the first frequency and a relatively small frequency difference; sweeping the first frequency over a frequency range at a plurality of frequency steps; detecting, with a photodetector, an optical output of the optical modulator at the plurality of frequency steps over the frequency range; first mixing an output of the photodetector with a first reference signal at a reference frequency that is equal to the relatively small frequency difference, to produce a first mixing output; second mixing the output of the photodetector with a second reference signal at the reference frequency, to produce a second mixing output, wherein the first reference signal and the second reference signal are orthogonal in phase to each other; at each frequency step over the frequency range, deriving a first measurement value from the first mixing output and a second measurement value from the second mixing output; and computing at least one of a frequency response and a time delay between the in-phase path and the quadrature path, based on the first measurement value and the second measurement value obtained at each frequency step over the frequency range In another form, an apparatus is provided comprising: an optical modulator having an in-phase path and a quadrature phase path; a photodetector coupled to an output of the optical modulator; a measurement unit coupled to the photodetector and including a first mixer and a second mixer; wherein during a calibration procedure, the optical modulator is configured to: set phase bias so that the in-phase path and the quadrature path are in phase; apply a first stimulus signal at a first frequency to one of the in-phase path or the quadrature path, and a second stimulus signal at a second frequency to another of the in-phase path or the quadrature path of the optical modulator, the second frequency being equal to a sum of the first frequency and a relatively small frequency difference; detect, with the photodetector, the output of optical modulator at a plurality of frequency steps over which the first frequency is swept during the calibration procedure; mix, with the first mixer, an output of the photodetector with a first reference signal at a reference frequency that is equal to the relatively small frequency difference, to produce a first mixing output; mix, with the second mixer, the output of the photodetector with a second reference signal at the reference frequency, to produce a second mixing output, wherein the first reference signal and the second reference signal are orthogonal in phase to each other; and at each frequency step over the frequency range, with the measurement unit, derive a first measurement value from the first mixing output and a second measurement value from the second mixing output.

In still another form, non-transitory processor readable medium is provided that stores instructions that, when executed by a processor, cause the processor to perform operations as part of a calibration procedure of an optical transmitter, the operations including: causing phase bias of an optical modulator of the optical transmitter to be set so that an in-phase path and a quadrature path of the optical modulator are in phase; supplying a first stimulus signal at a first frequency to one of the in-phase path or the quadrature path of the optical modulator, and a second stimulus signal at a second frequency to another of the in-phase path or the quadrature path of the optical modulator, the second frequency being equal to a sum of the first frequency and a relatively small frequency difference; causing the first frequency to be swept over a frequency range at a plurality of frequency steps; obtaining from the optical modulator a first measurement value and a second measurement value for each of the plurality of frequency steps, the first measurement value and second measurement value being derived by the optical modulator from an optical output of the optical modulator at the plurality of frequency steps over the frequency range; and computing at least one of a frequency response and a time delay between the in-phase path and the quadrature path, based on the first measurement value and the second measurement value obtained at each frequency step over the frequency range.

The above description is intended by way of example only. Various modifications and structural changes may be made therein without departing from the scope of the concepts described herein and within the scope and range of equivalents of the claims.

What is claimed is:

1. A method comprising:
    performing a calibration procedure of an optical transmitter, including:
        setting phase bias of an optical modulator of the optical transmitter so that an in-phase path and a quadrature path of the optical modulator are in phase;
        supplying a first stimulus signal at a first frequency to one of the in-phase path or the quadrature path of the optical modulator, and a second stimulus signal at a second frequency to another of the in-phase path or the quadrature path of the optical modulator, the second frequency being equal to a sum of the first frequency and a relatively small frequency difference;
        sweeping the first frequency over a frequency range at a plurality of frequency steps;
        detecting, with a photodetector, an optical output of the optical modulator at the plurality of frequency steps over the frequency range;
        first mixing an output of the photodetector with a first reference signal at a reference frequency that is equal to the relatively small frequency difference, to produce a first mixing output;
        second mixing the output of the photodetector with a second reference signal at the reference frequency, to produce a second mixing output, wherein the first reference signal and the second reference signal are orthogonal in phase to each other;
        at each frequency step over the frequency range, deriving a first measurement value from the first mixing output and a second measurement value from the second mixing output; and
        computing at least one of a frequency response and a time delay between the in-phase path and the quadrature path, based on the first measurement value and the second measurement value obtained at each frequency step over the frequency range.

2. The method of claim 1, further comprising, at least one of:
    computing one or more parameters for a compensation function based on the frequency response; or
    computing a time delay adjustment value based on the time delay.

3. The method of claim 2, further comprising configuring a transmitter signal processing device with at least one of: the one or more parameters for the compensation function or with the time delay adjustment value.

4. The method of claim 1, wherein the first frequency is co and the second frequency is $\omega+d\omega$, where $d\omega$ is the relatively small frequency difference.

5. The method of claim 4, wherein one of the first reference signal and the second reference signal is $\sin d\omega \cdot t$ and another of the first reference waveform and the second reference waveform is $\cos d\omega \cdot t$.

6. The method of claim 1, wherein detecting, first mixing, second mixing and deriving are performed at an optical device in which the optical modulator is included.

7. The method of claim 6, further comprising generating the first stimulus signal and the second stimulus signal at the transmit signal processing device.

8. The method of claim 7, wherein the controlling the sweeping are performed by the transmit signal processing device.

9. The method of claim 8, further comprising controlling the generating of the first stimulus signal and of the second stimulus signal at a control device that is separate from the optical device and the transmitter signal processing device.

10. The method of claim 8, wherein the controlling the sweeping are performed by the control device.

11. The method of claim 1, wherein the calibration procedure is automatically performed at power up of an optical device that includes the optical modulator.

12. The method of claim 1, wherein the calibration procedure is automatically performed for each of an X-polarization light path and a Y-polarization light path.

13. The method of claim 1, further comprising triggering an alarm when the frequency response deviates from a mask and/or when the time delay exceeds a threshold.

14. An apparatus comprising:
an optical modulator having an in-phase path and a quadrature phase path;
a photodetector coupled to an output of the optical modulator;
a measurement unit coupled to the photodetector and including a first mixer and a second mixer;
wherein during a calibration procedure, the optical modulator is configured to:
set phase bias so that the in-phase path and the quadrature path are in phase;
apply a first stimulus signal at a first frequency to one of the in-phase path or the quadrature path, and a second stimulus signal at a second frequency to another of the in-phase path or the quadrature path of the optical modulator, the second frequency being equal to a sum of the first frequency and a relatively small frequency difference;
detect, with the photodetector, the output of optical modulator at a plurality of frequency steps over which the first frequency is swept during the calibration procedure;
mix, with the first mixer, an output of the photodetector with a first reference signal at a reference frequency that is equal to the relatively small frequency difference, to produce a first mixing output;
mix, with the second mixer, the output of the photodetector with a second reference signal at the reference frequency, to produce a second mixing output, wherein the first reference signal and the second reference signal are orthogonal in phase to each other; and
at each frequency step over the frequency range, with the measurement unit, derive a first measurement value from the first mixing output and a second measurement value from the second mixing output.

15. The apparatus of claim 14, and further comprising a processor configured to compute at least one of a frequency response and a time delay between the in-phase path and the quadrature path, based on the first measurement value and the second measurement value obtained at each frequency step.

16. The apparatus of claim 15, wherein the processor is further configured to compute at least one of:
one or more parameters for a compensation function based on the frequency response; or
computing a time delay adjustment value based on the time delay.

17. The apparatus of claim 15, wherein the processor is part of a transmitter signal processing device separate from the optical modulator or an external control device separate from the optical modulator.

18. A non-transitory processor readable medium storing instructions that, when executed by a processor, cause the processor to perform operations as part of a calibration procedure of an optical transmitter, the operations including:
causing phase bias of an optical modulator of the optical transmitter to be set so that an in-phase path and a quadrature path of the optical modulator are in phase;
supplying a first stimulus signal at a first frequency to one of the in-phase path or the quadrature path of the optical modulator, and a second stimulus signal at a second frequency to another of the in-phase path or the quadrature path of the optical modulator, the second frequency being equal to a sum of the first frequency and a relatively small frequency difference;
causing the first frequency to be swept over a frequency range at a plurality of frequency steps;
obtaining from the optical modulator a first measurement value and a second measurement value for each of the plurality of frequency steps, the first measurement value and second measurement value being derived by the optical modulator from an optical output of the optical modulator at the plurality of frequency steps over the frequency range; and
computing at least one of a frequency response and a time delay between the in-phase path and the quadrature path, based on the first measurement value and the second measurement value obtained at each frequency step over the frequency range.

19. The processor readable medium of claim 18, further comprising instructions operable to cause the processor to perform at least one of:
computing one or more parameters for a compensation function based on the frequency response; or
computing a time delay adjustment value based on the time delay.

20. The processor readable medium of claim 19, further comprising instructions operable to cause the processor to configure a transmitter signal processing device with at least one of: the one or more parameters for the compensation function or with the time delay adjustment value.

* * * * *